2,870,151
Patented Jan. 20, 1959

2,870,151

MORPHOLINE ETHERS

Howard B. Wright and Marjorie B. Moore, Waukegan, Ill., assignors to Abbott Laboratories, North Chicago, Ill., a corporation of Illinois No Drawing. Application November 29, 1954
Serial No. 471,928

15 Claims. (Cl. 260—247.7)

The present invention relates to morpholine ethers and more particularly to lower alkoxy phenyl ethers of morpholinoalkanols.

The ethers of our invention have the general formula

M—R—O—Ar wherein M is a morpholino group, R is a lower alkylene group, and Ar is a lower alkoxy phenyl group wherein the alkoxy group has between about 2 and 7 carbon atoms inclusive. The term "morpholino," as used herein, is the group $O(CH_2CH_2)_2N—$.

In general, the compounds of the present invention are prepared by forming an alkali or alkaline earth metal salt of a hydroxy aryl compound, and reacting the resultant salt of the hydroxy compound with a morpholino alkyl halide to produce the corresponding aryl ether of the morpholinoalkanol.

The invention is illustrated by the following specific examples:

EXAMPLE I

γ-Morpholinopropyl 4-propoxyphenyl ether

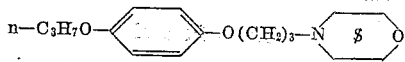

About 110 g. hydroquinone is added to a solution of 40 g. of sodium hydroxide in 350 cc. of water and 123 g. of n-propyl bromide is added and the mixture refluxed for about 24 hours. The solution is then cooled and extracted four times with 200 cc. of ether. The ether solution is then extracted four times with 100 cc. of 10% sodium hydroxide and acidified with hydrochloric acid after cooling. The dry concentrated material is crystallized from petroleum solvent to yield the mono-propyl ether of hydroquinone. About 5.6 g. of potassium hydroxide is dissolved in about 150 cc. of refluxing ethanol and then about 15.2 g. of the hydroquinone mono-propyl ether is added to the alcoholic solution. As soon as the said hydroquinone is dissolved, about 16.3 g. of γ-morpholinopropyl chloride dissolved in a small amount of ethanol is added to the refluxing solution and the solution is refluxed for about 24 hours and cooled. The product is recovered by filtering the reaction mixture and removing the solvent by vacuum distillation. The oily residue is acidified and shaken with ether. The acidic phase is made strongly alkaline with 40% sodium hydroxide and the oil which separates is extracted with ether. The ethereal phase is dried and the solvent removed by vacuum distillation. The residue product is distilled at a temperature of 153° C. at a pressure of 0.55 mm. On chemical analysis the product is found to contain 69.13% C and 8.96% H compared with a theoretical analysis of 68.78% C and 9.02% H.

The hydrochloride salt of the foregoing base is prepared by dissolving the base in ether and acidifying with hydrochloric acid and the crystalline salt recovered therefrom is found to have a melting point of 165–166° C. and a chemical analysis of 60.43% C and 8.17% H as compared with a theoretical analysis of 60.84% C and 8.23% H.

EXAMPLE II

γ-Morpholinopropyl 4-n-butoxyphenyl ether

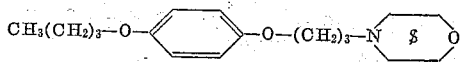

About 5.6 g. of potassium hydroxide is dissolved in about 150 cc. of refluxing ethanol, and then about 16.6 g. of hydroquinone mono-butyl ether is added to the alcoholic solution. When the hydroquinone is dissolved, about 16.3 g. of γ-morpholinopropyl chloride (dissolved in a small amount of ethanol) is added to the refluxing solution. The solution is refluxed for about 24 hours and then cooled. The product is recovered by filtering the reaction mixture and then removing the solvent by vacuum distillation. The oily residue is acidified and shaken with ether. The acidic phase is made strongly alkaline with 40% sodium hydroxide, and the oil which separates is extracted into ether. The ethereal phase is dried, and the solvent removed by vacuum distillation. The product distills at 183–184° C. at a pressure of 2.8 mm.

EXAMPLE III

γ-Morpholinopropyl 3-butoxyphenyl ether

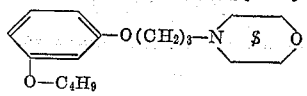

About 5.6 g. of potassium hydroxide dissolved in 150 cc. of refluxing ethanol and about 16.6 g. of 3-butyl hydroquinone ether is added to the alcoholic solution. When the said ether is dissolved, about 16.3 g. of γ-morpholinopropyl chloride dissolved in a small amount of ethanol is added and the solution refluxed for about 24 hours. The cooled reaction mixture is filtered and the solvent removed by vacuum distillation. The oily residue is acidified and shaken with ether and the acid phase is made strongly alkaline with 40% sodium hydroxide. The oil which separates is extracted into ether, dried, and the solvent removed by vacuum distillation. The base, γ-morpholinopropyl 3-butoxyphenyl ether, distills at a temperature of 190–191° C. at a pressure of 2.1 mm. and is found to have a chemical analysis of 69.87% C and 9.22% H compared with a theoretical analysis of 69.59% C and 9.27% H.

The hydrochloride salt of the foregoing base is prepared by dissolving the base in ether and acidifying with hydrochloric acid and is found to have a melting point of 131–133° C.

EXAMPLE IV

γ-Morpholinopropyl-2-n-butoxyphenyl ether

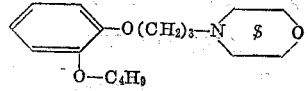

To a refluxing solution of 5.6 g. of potassium hydroxide and 16.6 g. of 2-n-butoxyphenol in 200 cc. of ethyl alcohol is added 16.3 g. of γ-morpholinopropyl chloride and the mixture refluxed for about 24 hours. The cooled reaction mixture is filtered and the solvent removed by vacuum distillation. The oily residue is acidified and the base precipitated by the addition of sodium hydroxide as in the preceding example. The oil which separates is extracted with ether, dried, and the solvent removed by vacuum distillation to yield the base γ-morpholinopropyl-2-n-butoxyphenyl ether having a boiling point of 193–194° C. at a pressure of 4.3 mm. On chemical analysis the base is found to contain 69.44% C and 9.10% H as compared with a theoretical analysis of 69.59% C and 9.27% H.

EXAMPLE V

γ-Morpholinopropyl 4-sec-butoxyphenyl ether

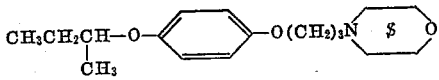

To about 3.8 g. of potassium hydroxide in 100 cc. of ethyl alcohol and 12 g. of sec-butoxyphenol which is refluxed to form a uniform solution is added 11 g. of γ-morpholinopropyl chloride and the mixture refluxed for about 24 hours. The cooled reaction mixture is filtered and the solvent removed by vacuum distillation. The only residue is acidified and the ether extract thereof made strongly alkaline with sodium hydroxide. The ether extract of the oil which separates is dried and the solvent removed by vacuum distillation to yield the base, γ-morpholinopropyl 4-sec-butoxyphenyl ether, which boils at a temperature of 166° C. at a pressure of 0.8 mm. and which has a chemical analysis of 69.67% C and 9.11% H as compared with a theoretical analysis of 69.59% C and 9.27% H.

The hydrochloride salt of the foregoing base prepared as in the preceding examples has a melting point of 143–144° C.

EXAMPLE VI

γ-Morpholinopropyl 2-chloro-4-butoxyphenyl ether

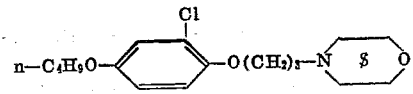

About 16.6 g. of p-butoxyphenol is dissolved in 100 cc. of dry benzene and 14.7 g. sulfuryl chloride is added to the solution. The reaction mixture is refluxed for about 5 hours and thereafter concentrated in vacuo and treated twice with dry benzene. The solution is distilled to yield 2-chloro-4-butoxyphenol having a boiling point of 151–152° C. at a pressure of 5.0 mm. To 11 g. of 2-chloro-4-butoxyphenol in 150 cc. of ethyl alcohol is added 3.8 g. of potassium hydroxide and the reaction mixture refluxed. When a uniform solution is formed, 9 g. of γ-morpholinopropyl chloride is added and the solution refluxed for about 24 hours. The cooled reaction mixture is filtered, the solvent removed by vacuum distillation and the oily residue acidified and the ether extract thereof made strongly alkaline with sodium hydroxide. The oil which separates is dried and the solvent removed to yield the base γ-morpholinopropyl 2-chloro-4-butoxyphenyl ether which distills at a temperature of 204–205° C. at a pressure of 3.2 mm. On chemical analysis the base is found to contain 62.28% C and 8.18% H as compared with a theoretical analysis of 62.28% C and 7.99% H.

EXAMPLE VII

γ-Morpholinopropyl 4-amoxyphenyl ether

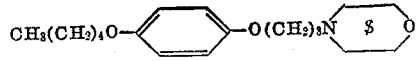

About 5.6 g. of potassium hydroxide is dissolved in 150 cc. of ethyl alcohol and 18 g. of mono-n-amoxyphenol is added and the mixture refluxed for about 15 minutes. To the refluxing mixture is added 16.3 g. of γ-morpholinopropyl chloride and the mixture refluxed for about 24 hours. The cooled reaction mixture is filtered and the base, γ-morpholinopropyl 4-amoxyphenyl ether, recovered as in the preceding examples has a boiling point of 188° C. at a pressure of 1.7 mm. On chemical analysis the base is found to contain 70.62% C and 9.47% H as compared with a theoretical analysis of 70.33% C and 9.51% H.

The hydrochloride salt of the foregoing base prepared as in the preceding examples is found to have a melting point of 170–172° C.

EXAMPLE VIII

γ-Morpholinopropyl 4-heptoxyphenyl ether

About 20.8 g. of 4-heptoxyphenol is dissolved in 300 cc. of ethyl alcohol containing 5.6 g. of potassium hydroxide. To the refluxing solution is added 16.3 g. of γ-morpholinopropyl chloride and the reaction mixture refluxed for about 24 hours. The cooled reaction mixture is filtered and the base recovered therefrom as in the preceding examples to yield the product γ-morpholinopropyl 4-heptoxyphenyl ether having a boiling point of 200° C. at a pressure of 0.7 mm. On chemical analysis the base is found to contain 71.86% C and 9.65% H as compared with a theoretical analysis of 71.60% C and 9.91% H.

EXAMPLE IX

γ-Morpholinopropyl 2-ethoxy-5-propenylphenyl ether

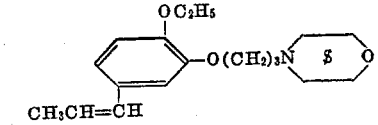

About 5.6 g. potassium hydroxide and about 17.8 g. of propenyl guaethol are dissolved in about 150 cc. of refluxing ethanol. About 16.3 g. of γ-morpholinopropyl chloride, dissolved in a small amount of ethanol, is added to the refluxing mixture, and the refluxing continued for about 24 hours. The product is recovered according to the procedure of Example I, and distills at 195–196° C. at a pressure of 2.5 mm. The hydrochloride salt of the foregoing base has a melting point of 187–188° C.

EXAMPLE X

β-Morpholinoethyl 4-n-butoxyphenyl ether

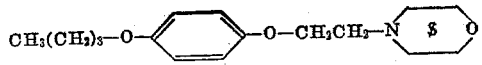

About 16.6 g. of hydroquinone mono-butyl ether is added to 200 cc. of refluxing ethanol containing 5.6 g. of potassium hydroxide. Then about 14.9 g. of γ-morpholinoethyl chloride in a small amount of ethanol is added rapidly to the refluxing solution, and the heating continued for 24 hours. The solution is worked up according to the procedure of Example I, and the product distills at 201° C. at a pressure of 9 mm.

EXAMPLE XI

δ-Morpholinobutyl 4-butoxyphenyl ether

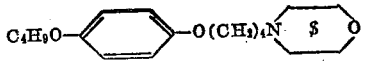

About 13 g. of δ-(4-butoxy)-phenoxybutyl bromide is dissolved in 100 cc. of dry toluene and 8.2 g. morpholine is added thereto. The mixture is refluxed for 7 hours. The cooled reaction mixture is filtered and the solution extracted with 10% hydrochloric acid. The acidic layer is made basic with sodium hydroxide and the oil which separates is extracted into ether. Thereafter the solvent is removed by vacuum distillation to yield the product δ-morpholinobutyl 4-butoxyphenyl ether having a boiling point of 165° C. at a pressure of 0.7 mm. On chemical analysis the base is found to contain 7.60% C. and 9.21% H as compared with a theoretical analysis of 70.33% C. and 9.51% H.

The hydrochloride salt of the foregoing base has a melting point of 141–143° C.

EXAMPLE XII

ε-Morpholinoamyl 4-butoxyphenyl ether

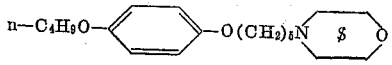

About 29 g. of 4-butoxyphenoxy amyl bromide is dissolved in 100 cc. of toluene and the solution filtered. Thereafter a solution of 17.4 g. of morpholine dissolved in toluene is added dropwise to the foregoing bromide solution. The mixture is refluxed for about 7 hours, and the cooled solution filtered. The filtrate is concentrated and distilled at a temperature of 165–170° C. at a pressure of 0.4 mm. The product solidifies readily and after recrystallizing from ether yields the base ε-morpholinoamyl 4-butoxyphenyl ether having a melting point of 40–41° C.

The hydrochloride salt of the base is prepared as in Example I and is found to have a melting point of 164–166° C. and a chemical analysis of 63.89% C. and 8.78% H as compared with a theoretical analysis of 63.76% C. and 9.01% H.

The compounds of the present invention are also prepared by refluxing in a dry solvent an ω-haloalkyl aryl ether with morpholine. The hydrohalide salt is then separated by suitable means and the desired ether recovered.

Still another method of preparing the compounds of the present invention comprises reacting an alkali metal in a finely divided form, such as a dispersion of sodium in toluene, with the desired aryl phenol to form the alkali metal salt of the hydroxy aryl compound and treating the said alkali metal salt with a lower alkyl dihalide, such as 1-chloro-3-bromo-propane or 1,3-dibromo-propane, to form the halide of the aryl alkyl ester and reacting the said halide with morpholine to produce the desired morpholino ether. It should be understood that in place of the alkali metal one can use an alcoholate or alkali metal hydride to prepare the alkali metal salts of the desired hydroxy aryl compound.

The ω-haloalkyl aryl ethers for the starting materials may be obtained by the usual methods, as by the reaction of the sodium salt of the aryl hydroxide with an alkyl dihalide. Similarly, the sodium salt of the aryl hydroxide may be reacted with a halohydrin, and the resulting ω-hydroxyalkyl aryl ether is further reacted with a phosphorus or thionyl halide or a halogen acid to give the desired ω-haloalkyl aryl ether. The reaction of the ω-haloalkyl aryl ether with morpholine gives the desired alkamine ether.

The salts are generally prepared by dissolving the products (which are bases) in a solvent and adding an acid, which precipitates the salt. For example, by dissolving γ-morpholinopropyl 4-n-butoxyphenyl ether in dry ether and adding a solution of hydrochloric acid, sulfuric acid, citric acid, picric acid, or the like, the corresponding hydrochloride, sulfate, citrate, picrate, or the like salt, respectively, of the γ-morpholinopropyl 4-n-butoxyphenyl ether is formed. Similarly, the salts of the other named bases may be prepared.

It should be understood that the alkoxy phenyl group of the compounds of the present invention may be either substituted or unsubstituted with the substituents being preferably not more than three and being either mixed or identical substituents. The substituent groups may be alkyl, alkenyl, nitro, halo, phenyl, hydroxy, alkoxy, morpholinoalkoxy, aralkoxy, and aryloxy. An example of an alkyl substituted alkoxy morpholino ether is γ-morpholinopropyl 2-ethoxy-5-n-propyl phenyl ether (the hydrochloride of which has a melting point of 149° C.) and examples of a morpholino alkoxy substituted morpholino ether are γ-morpholinopropyl 4-γ-morpholinopropoxyphenyl ether having a melting point of 103–104° C. (the dihydrochloride having a melting point of 270–273° C.) and γ-morpholinopropyl 3-γ-morpholinopropoxyphenyl ether having a boiling point of 217–218° C. at a pressure of 1.6 mm.

Compounds of the invention are useful as intermediates for certain organic compounds, and further have utility as local anesthetics, either for surface anesthesia or in wheals for regional anesthesia. Generally, the compounds are used therapeutically in the form of inorganic or organic salts, for example, the hydrochloride, sulfate, citrate, picrate, and the like. Because of the low toxicity and low sensitizing properties of the compounds, such as γ-morpholinopropyl 4-n-butoxyphenyl ether, and the very excellent anesthesia produced there is provided by the present invention a superior local anesthetic. Pharmaceutically useful forms of the invention are illustrated by the following specific examples:

EXAMPLE XIII

A sterile anesthetic solution for irrigation is prepared by admixing the following ingredients in the proportions specified:

| | Percent |
|---|---|
| γ-Morpholinopropyl 4-n-butoxyphenyl ether.HCl | 1.0 |
| Benzyl alcohol | 0.9 |
| Water for injection, q. s. | |

EXAMPLE XIV

A highly effective anesthetic jelly is prepared by combining the following ingredients in the specified proportions:

| | Percent |
|---|---|
| γ-Morpholinopropyl 4-n-butoxyphenyl ether.HCl | 1.0 |
| Methocel | 4.25 |
| Propylene glycol | 20.0 |
| Distilled water, q. s. | |

EXAMPLE XV

A highly effective anesthetic cream in a water miscible base is prepared by combining the following ingredients in the specified proportions:

| | Percent |
|---|---|
| γ-Morpholinopropyl 4-n-butoxyphenyl ether | 1.0 |
| Propylene glycol | 57.0 |
| Carbowax–6000 | 42.0 |

It should also be understood that compounds of the present invention can be prepared in the form of anesthetic lotions, as by incorporating 1% of the γ-morpholinopropyl 4-n-butoxyphenyl ether hydrochloride in a calamine, zinc oxide suspension. It is also possible, if desired, to prepare compounds of the present invention dispersed in a solid carrier, such as cocoa butter and spermaceti. In each of the foregoing pharmaceutical preparations it is also possible to incorporate other medicaments therewith, such as an antihistaminic, or sulfa drugs, such as sulfadiazine.

In the present application the term "lower alkylene" is used to designate a bivalent lower hydrocarbon radical other than an alkylidene group or the like in which both valences are taken from the same carbon atom.

This application is a continuation-in-part of applicants' now abandoned co-pending application Serial No. 187,666, filed September 29, 1950.

Others may readily adapt the invention for use under various conditions of service, by employing one or more of the novel features disclosed or equivalents thereof. As at present advised with respect to the apparent scope of our invention, we desire to claim the following subject matter.

We claim:

1. A compound selected from the class consisting of compounds having the general formula

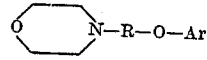

wherein R is a divalent lower saturated aliphatic hydrocarbon group having at least 2 carbon atoms in the carbon chain, and Ar is a group selected from the class consisting of a lower alkoxy phenyl group, a lower alkenyl substituted lower alkoxy phenyl group, a lower alkyl substituted lower alkoxy phenyl group, and a halogen substituted lower alkoxy phenyl group wherein the alkoxy group has between two and seven carbon atoms inclusive, and the salts thereof.

2. A lower alkoxy phenyl ω-N-morpholino-lower alkylene ether wherein the said alkylene group has at least 2 carbon atoms in the carbon chain.

3. An acid addition salt of a lower alkoxy phenyl ω-N-morpholino lower alkylene ether wherein the said alkylene group has at least 2 carbon atoms in the carbon chain.

4. An ω-N-morpholino lower alkylene butoxyphenyl ether wherein the said alkylene group has at least 2 carbon atoms in the carbon chain.

5. An acid addition salt of an ω-N-morpholino lower alkylene butoxy phenyl ether wherein the said alkylene group has at least 2 carbon atoms in the carbon chain.

6. A γ-N-morpholinopropyl lower alkoxy phenyl ether.

7. An acid addition salt of a γ-N-morpholinopropyl lower alkoxy phenyl ether.

8. The compound γ-N-morpholinopropyl 4-n-butoxyphenyl ether.

9. The hydrochloride salt of γ-N-morpholinopropyl 4-n-butoxyphenyl ether.

10. An acid addition salt of γ-N-morpholinopropyl 4-butoxy phenyl ether.

11. The compound γ-N-morpholinopropyl 4-amoxyphenyl ether.

12. The compound β-N-morpholinoethyl 4-butoxyphenyl ether.

13. The compound δ-N-morpholinobutyl 4-butoxyphenyl ether.

14. A process of preparing a compound having the general formula

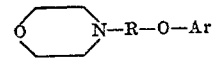

wherein R is a divalent lower saturated aliphatic hydrocarbon group having at least 2 carbon atoms in the carbon chain, and Ar is a group selected from the class consisting of a lower alkoxy phenyl group, a lower alkenyl substituted lower alkoxy phenyl group, a lower alkyl substituted lower alkoxy phenyl group, and a halogen substituted lower alkoxy phenyl group wherein the alkoxy group has between two and seven carbon atoms inclusive; which comprises reacting a metal hydroxide in a lower aliphatic alcohol solvent with an Ar hydroxy compound, and reacting the resultant metal salt of the Ar hydroxy compound with an ω-N-morpholino lower alkyl halide to produce the corresponding ether of ω-N-morpholino lower alkanol.

15. The process which comprises refluxing potassium hydroxide in a lower aliphatic alcohol solvent with hydroquinone mono-butyl ether, and adding γ-N-morpholinopropyl chloride to the refluxing mixture to produce γ-N-morpholinopropyl 4-n-butoxyphenyl ether.

References Cited in the file of this patent

UNITED STATES PATENTS

| 2,484,621 | Hardman | Oct. 11, 1949 |
| 2,679,501 | Wenner | May 25, 1954 |

FOREIGN PATENTS

| 130,555 | Australia | Nov. 28, 1946 |

OTHER REFERENCES

Idson: Chemical Reviews, vol. 47, number 3, pp. 419–420, Sept. 12, 1950.